July 5, 1927.
W. J. ANDRES
1,634,250
BRAKE OPERATING MECHANISM
Filed Feb. 4, 1926
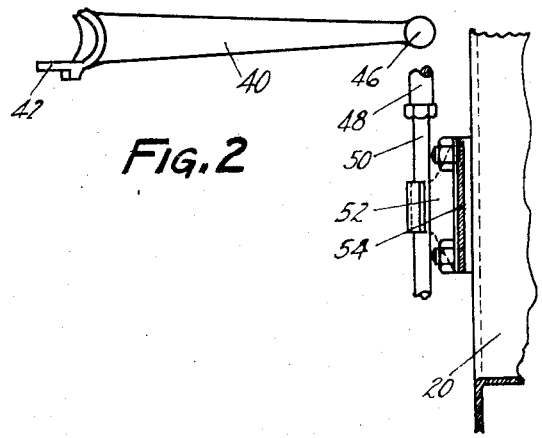
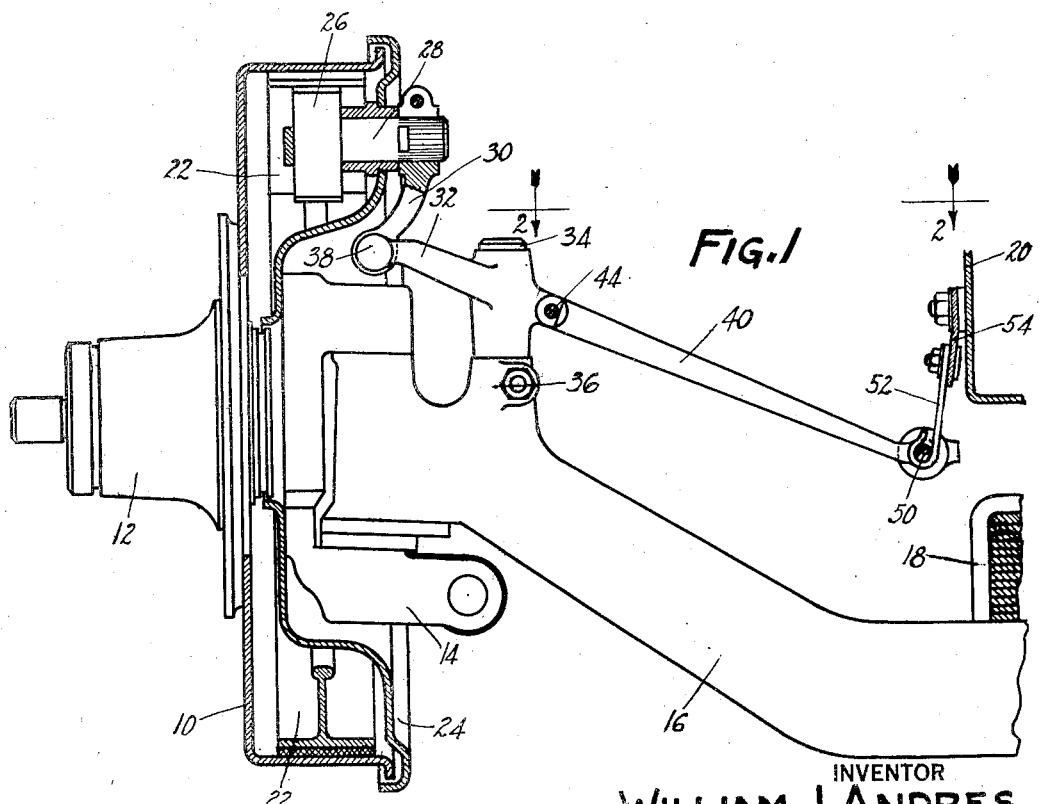
INVENTOR
WILLIAM J. ANDRES
BY
M. W. McConkey
ATTORNEY Patented July 5, 1927.

1,634,250

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed February 4, 1926. Serial No. 85,951.

This invention relates to brakes, and is illustrated as embodied in novel operating mechanism for a brake on an automobile wheel. An object of the invention is to provide for the use of a control including a brake-operating lever, in lieu of the usual and more expensive shaft, while at the same time supporting the inner end of the control for movement with the chassis frame, or some similar part, so that the action of the chassis-supporting springs will not affect the brake pedal or the like, thus obviating "pedal fight." In one advantageous arrangement, the lever is in two connected sections, the inner section being supported as described, preferably on the chassis frame, and the other or outer section being fulcrumed near the end of the axle.

Other features of novelty relate to the improved support on the frame, which utilizes a piece of heavy fabric to minimize the necessary lubrication, and to the particular arrangement of the outer lever section, which preferably has a ball or other part arranged with its center in or immediately adjacent the swivelling axis of the wheel, at least when the brake is applied, and to other novel combinations of parts and desirable particular constructions which will be apparent from the following description of one illustrative embodiment shown in the accompanying drawing, in which:

Fig. 1 is a vertical transverse section through one front brake of an automobile, and through associated parts; and Fig. 2 is a top plan view of portions of some of the parts shown in Fig. 1.

The particular chassis illustrated includes a brake drum 10 rotating with a front wheel, the hub of which is shown at 12, and which is rotatably mounted on a knuckle 14 swivelled, by a king pin or the like, at one end of a front axle 16. Axle 16, with a rear axle (not shown), supports through springs 18 the usual chassis frame 20. The term "chassis frame" is used herein as a convenient generic designation for the sprung part of the vehicle, and not as designating any particular type of frame.

The brake includes friction means, such as shoes 22 anchored on a backing plate 24 carried by knuckle 14, engageable with the drum 10 by operation of suitable means such as a double cam 26 on a shaft 28 carried by the backing plate. Shaft 28 is shown as being rocked to apply the brake by an arm 30 having a flat or plane vertical surface at its lower end.

According to an important feature of the present invention, arm 30 or the like is operated by a novel sectional lever movable generally horizontally,—i. e. about a generally vertical axis,—and preferably with the inner section supported by the chassis frame 20, although in its broader aspects some of the advantages of the invention are obtainable by substituting a different operating device for the outer section of the lever.

In the particular arrangement illustrated, the outer section 32 of the lever is fulcrumed near the end of axle 16 on a pin 34 clamped in a boss 36 on the axle. The end of section 32 is shown formed as a ball 38 engaging the vertical plane surface on the end of arm 30, the center of ball 38 being movable in applying the brake in a plane substantially perpendicular to the swivelling axis of the wheel to an active position in that axis. If it is desired to relieve the pressure on the brake when the wheel is swivelled to place it on the outer side of a turn, the center of ball 38 when the brake is applied is displaced five or six hundredths of an inch from the swivelling axis, on the side next the wheel.

The inner section 40 of the lever is shown forked at its outer end, to form arms 42 straddling the inner end of section 32, the arms being connected thereto by means such as a horizontal pivot 44 substantially parallel to the adjacent portion of frame 20. This permits vertical movement of section 40 without affecting section 32.

The inner end of section 40 is shown with an integral ball 46 received in a socket 48 at the end of a brake rod or other tension connection 50. The section 40, and connection 50, are supported on the chassis frame 20, as for example by a sheet metal pressed hook 52 slidably embracing connection 50 and movably secured to frame 20 by a flexible piece 54 of the heavy fabric used for spring shackle substitutes and the like. Connection 50 slides lengthwise in hook 52 in operating the brakes.

If the lever were wholly supported by the axle, and since each spring 18 is pivoted or otherwise confined at one end, flexing of the springs would cause a short fore-and-aft movement of the axle, and therefore of the lever, which might react on the pedal or the like to cause "pedal fight." In the above-described arrangement, however, the end of the lever which is operatively connected to the pedal is supported for movement with the chassis frame, so that spring movement merely causes a slight lengthwise movement of the lever, allowed by the flexing of fabric 54. As this movement is quite small, and is at right angles to brake rod 50, it has no effect on the pedal.

While one illustrative embodiment has been described in detail, it is not my intention to limit the scope of the invention to that particular embodiment, or otherwise than by the terms of the appended claims.

I claim:

1. A vehicle having a chassis frame and a swivelled wheel with a brake, and comprising, in combination therewith, a brake-applying generally-horizontal lever supported at its outer end for up and down movement with the wheel and at its inner end supported on the chassis frame, and operating means for swinging the lever to apply the brake in a plane generally perpendicular to the swivelling axis of the wheel.

2. A vehicle having a chassis frame and a wheel with a brake, and comprising, in combination therewith, a brake-applying generally-horizontal lever supported at its outer end for up and down movement with the wheel and its inner end supported on the chassis frame, and operating means for swinging the lever to apply the brake in a generally-horizontal direction.

3. A vehicle having a chassis frame and an axle, with a wheel and brake mounted at the end of the axle, and comprising, in combination therewith, a brake-applying lever fulcrumed near the end of the axle and moving at its fulcrum with the axle, and means for supporting the inner end of the lever for movement with the chassis frame.

4. A vehicle having a chassis frame and an axle, with a wheel and brake mounted at the end of the axle, and comprising, in combination therewith, a brake-applying lever fulcrumed near the end of the axle and moving at its fulcrum with the axle, and a flexible support for the inner end of the lever carried by the chassis frame.

5. A vehicle having a chassis frame and an axle, with a wheel and brake mounted at the end of the axle, and comprising, in combination therewith, a horizontally movable brake-applying lever fulcrumed near the end of the axle and moving at its fulcrum with the axle and including a part movable in a vertical plane, a tension connection for said part of the lever, and means carried by the chassis frame for supporting said connection and the inner end of the lever.

6. A vehicle having a chassis frame and an axle, with a wheel and brake mounted at the end of the axle, and comprising, in combination therewith, a brake-applying lever fulcrumed near the end of the axle and moving at its fulcrum with the axle, a tension connection for the inner end of the lever, and a support carried by the chassis frame and engaging said connection and through said connection supporting the inner end of the lever.

7. A vehicle having a chassis frame and a wheel with a brake, and comprising, in combination therewith, a brake-applying lever moving at its outer end with the wheel and brake and so supported that its inner end may move vertically with respect to the wheel, and means for supporting the inner end of the lever on the chassis frame.

8. A vehicle having a chassis frame and a wheel with a brake, and comprising, in combination therewith, a brake-applying lever moving at its outer end with the wheel and brake and so supported that its inner end may move vertically with respect to the wheel, a tension connection for the inner end of said lever, and means on the chassis frame supporting the connection and the inner end of the lever.

9. A vehicle having a chassis frame and a wheel with a brake, and comprising, in combination therewith, a brake-applying lever moving at its outer end with the wheel and brake and so supported that its inner end may move vertically with respect to the wheel, a tension connection for the inner end of said lever, and supporting means on the chassis frame engaging the connection and through the connection supporting the inner end of the lever.

10. A vehicle having a chassis frame and a wheel with a brake, and comprising, in combination therewith, a brake-applying device having an outer part moving with the wheel and so supported that its inner end may move vertically with respect to the wheel, a tension connection for the inner part of said device, and supporting means on the chassis frame engaging the tension connection and through the connection supporting the inner end of said device.

11. A vehicle having a chassis frame and a wheel with a brake, and comprising, in combination therewith, a brake-applying device having an outer part moving with the wheel, a tension connection for the inner part of said device, and supporting means on the chassis frame and slidably embracing the tension connection and through the connection supporting the inner end of said device.

12. A vehicle having a chassis frame and a wheel with a brake, and comprising, in combination therewith, a brake-applying device having an outer part moving with the wheel, a tension connection for the inner part of said device, and a flexible support secured to the chassis frame engaging the tension connection and through the connection supporting the inner end of said device.

13. A vehicle having a chassis frame and a wheel with a brake, and comprising, in combination therewith, a piece of flexible heavy fabric secured at its upper edge to the frame opposite the brake, an upwardly-opening hook carried by the fabric, and brake-applying connections embraced and supported by said hook.

14. A vehicle having a chassis frame and an axle, and a wheel with a brake, and comprising, in combination therewith, a sectional lever including parts movable together in a generally horizontal direction but connected to permit relative vertical movement, one of said parts being fulcrumed near the end of the axle and moving with the wheel and arranged to operate the brake, the other part being supported by the chassis frame, and means acting on said other part to rock the lever to apply the brake.

15. A vehicle having a chassis frame and a wheel with a brake, and comprising, in combination therewith, a sectional lever including parts movable together in a generally horizontal direction but connected to permit relative vertical movement, one of said parts moving with the wheel and arranged to operate the brake, the other part being supported by the chassis frame, and means acting on said other part to rock the lever to apply the brake.

16. A vehicle having a chassis frame and an axle, and a swivelled wheel with a brake, and comprising, in combination therewith, a sectional lever having one part fulcrumed near the end of the axle and with its outer brake-applying end movable in a plane substantially perpendicular to the swivelling axis of the wheel, the other part being pivotally connected thereto for relative vertical movement, and means on the chassis frame for supporting the inner end of said other part.

17. A vehicle having a chassis frame and an axle, and a swivelled wheel with a brake, and comprising, in combination therewith, a sectional lever having one part fulcrumed near the end of the axle and with a ball at its outer brake-applying end movable with its center in a plane substantially perpendicular to the swivelling axis of the wheel, said center being in or immediately adjacent the swivelling axis when the brake is applied, the other part being pivotally connected thereto for relative vertical movement, and means on the chassis frame for supporting the inner end of said other part.

18. A vehicle having a chassis frame and an axle, and a wheel with a brake, and comprising, in combination therewith, a lever section fulcrumed near the end of the axle for movement about a generally vertical axis, with one end projecting outwardly toward the wheel and arranged to operate the brake and the other end projecting inwardly toward the chassis frame, a second lever section supported at its inner end on the chassis frame and having its outer end forked to form arms straddling the inwardly-projecting end of the first section, and a horizontal pivot connecting said arms with said inwardly-projecting end.

19. A vehicle having a chassis frame and an axle, and a swivelled wheel with a brake, and comprising, in combination therewith, a lever section fulcrumed near the end of the axle for movement about a generally vertical axis, with one end projecting outwardly toward the wheel and arranged substantially in the swivelling axis when the brake is applied and with the other end projecting inwardly toward the chassis frame, a second lever section supported at its inner end on the chassis frame and having its outer end forked to form arms straddling the inwardly-projecting end of the first section, and a horizontal pivot connecting said arms with said inwardly-projecting end.

20. A vehicle having a chassis frame and a wheel with a brake, and comprising, in combination therewith, a brake-applying device adjacent the wheel, and an operating lever member for said device which is supported at its inner end by the chassis frame and which is pivoted to said device for vertical movement about an axis approximately parallel to said frame, said lever member moving generally horizontally to apply the brake and generally vertically to compensate for movement of the chassis frame.

21. A vehicle having a chassis frame and a swivelled wheel with a brake, and comprising, in combination therewith, a brake-applying device adjacent the wheel and having a part in the swivelling axis at least when the brake is applied, and an operating lever member for said device which is supported at its inner end by the chassis frame and which is pivoted to said device for vertical movement about an axis approximately parallel to said frame, said lever member moving generally horizontally to apply the brake and generally vertically to compensate for movement of the chassis frame.

In testimony whereof, I have hereunto signed my name.

WILLIAM J. ANDRES.